Nov. 14, 1950     A. ABRAHAM, JR     2,530,320
CORROSION RESISTANT LINER MATERIALS
AND METHOD OF MAKING THE SAME
Filed May 22, 1948
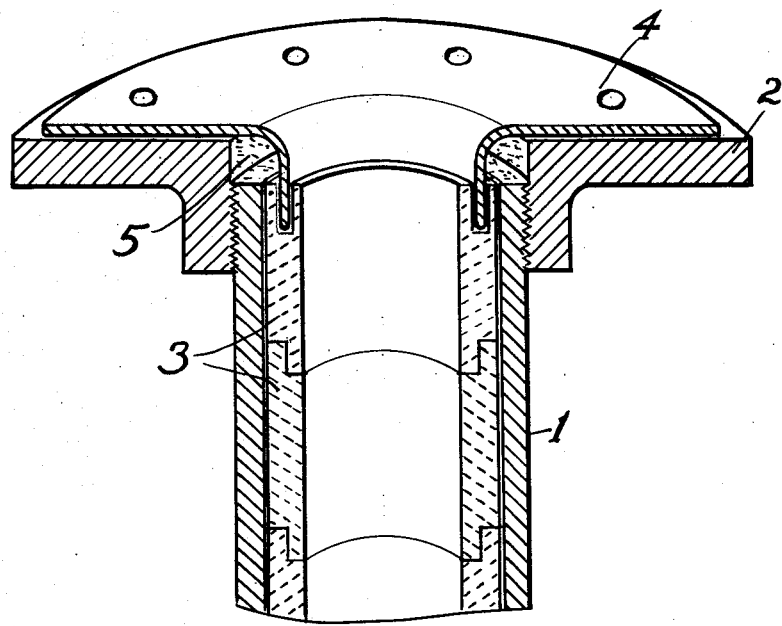
Albert Abraham Jr. Inventor
By W. O. T. Heilman Attorney

UNITED STATES PATENT OFFICE 2,530,320

CORROSION RESISTANT LINER MATERIALS AND METHOD OF MAKING THE SAME

Albert Abraham, Jr., Staten Island, N. Y., assignor to Standard Oil Development Company, a corporation of Delaware Application May 22, 1948, Serial No. 28,716

7 Claims. (Cl. 117—95)

The present invention relates to lining materials and liners for corrosive service and to the method of forming such liners and liner materials. It is an object of the invention to provide a corrosion resistant lining in which penetration of the lining by the corrosive material is substantially avoided. It is also an object of the invention to provide a liner for containers or conduit elements which may be assembled without the use of expensive interliners between the lining proper and the pressure resistant casing of the element.

In corrosive service, as in the manufacture and handling of sulphuric acid, or in the handling of materials containing corrosive substances, it is customary to line the piping and other parts of the equipment used with inert corrosion resistant materials such as structural carbon. These linings are usually precast or preformed as small units to fit the contours of the equipment and assembled in place. Various cementing and sealing materials are used for joints and in contacts with the pressure resisting casings.

In such service, it is desirable that the lining material be substantially impervious, and such materials are usually quite expensive both as to original cost, including assembly, and for maintenance. Furthermore, in view of the many joints between units of the lining material, and because even the best materials may be naturally porous to some extent, it is often necessary to provide auxiliary protection against penetration of the corrosive substances throughout the lining material or the joints between units. For this purpose, interliners of lead have been provided, either as thin sheets, deposited on the inner surface of the pressure casing, or cast in place, with the casing and liner serving as a mold. Under any circumstances, however, such liners and methods of assembly have proved expensive and not too satisfactory.

According to the present invention, the weaknesses of previous methods and means may be substantially overcome by the use of liners of lower grade materials and without the need for interliners such as of lead. The invention and its objects may be more fully understood from the following description when read in conjunction with the accompanying drawing in which is shown a vertical section of a portion of a conduit having a liner formed in accordance with the invention:

In the drawing, the numeral 1 designates a pressure resistant conduit casing such as a still tube having a flange unit 2 for connection of one section of tubing to another. The casing 1 is provided with a liner made up of a plurality of liner units or elements 2. These elements are preferably of structural carbon or another micro porous or porous lining material of comparable nature. The liner elements 2 may be formed with any suitable type of jointing arrangement and also provided for establishing a fluid type seal between the liner and the casing end and flange such as a lead shield element 4 flared outwardly from the liner to extend over the inner face of the flange thereby providing a corrosion resistant gasket means between flange elements. In assembling the liner in the casing, it is preferred that an inert cementitious coating material be provided for the inner surface of the casing and that this or a similar material be used to fill any space between shield 4 and the end of the casing 1 as indicated by the numeral 5. Although, as indicated, asphalt or a similar material may be used to coat the interior surface of the pressure casing 1 prior to or during assembly of the liner, it is preferred that this material be substantially prevented from penetrating the joints between liner units to any great extent.

The substantially porous liner material used for the elements 3 may be of much higher degree of porosity than that ordinarily considered as suitable for such service, as it is intended that the liner material be treated either before or after assembly with a solution of a soluble metallic salt or other salt capable of entering into an exchange reaction with either the corrosive material to be handled, or with another corrosive or acid material, to form a substantially insoluble, substantially inert salt deposit within the pores and joints of the liner material. For example, in equipment for handling sulfuric acid a substantially porous structural carbon liner material may be treated with a lead acetate solution to deposit this soluble salt in the pores and joints of the assembled liner. After such treatment, with lead acetate solution to obtain substantial penetration of the liner material, the liner may then be treated or subjected to the action of sulfuric acid to form lead sulfate within the pores and joints of the liner in such depth as may be possible by ordinary surface contact or by pressure treatment with the acid material.

According to the preferred method, the individual liner units are subjected to pressure treatment with a soluble salt solution prior to assembly substantially dried and then assembled to form a lining for the equipment in which it is to be used. The liner, so formed, is then given an additional treatment with the soluble salt solution, and then contacted with an acid material under pressure to form a deposit in depth of an insoluble salt in the pores, joints and crevices of the finished liner. It is preferred that the treating materials employed should be such that the insoluble salt formed in the final treatment will be one which has a somewhat greater bulk than the soluble salt with which the liner is impregnated, thus insuring complete plugging of all passages through which penetration of the corrosive material might occur.

Various methods of accomplishing the treatment may be employed as for example, assembly of the untreated liner with subsequent treatment in situ, and although considered preferable that the soluble salt solution be applied so as to obtain substantial penetration of the liner and joints whereby a reserve of soluble salt deposits is established in depth, where little or no erosion can be expected in service, mere surface coating of the lining with the soluble salt solution without pressure application may provide adequate sealing of the pores, joints, and crevices by the insoluble salt deposit formed upon contact with a suitable corrosive or acid material. Likewise, various other materials than lead acetate and sulfuric acid may be employed. For example lead sulfate deposits may be formed by first depositing lead chloride or lead nitrate from a solution thereof and subsequently contacting with sulfuric acid. Where hydrogen chloride is to be the principal corrosive material to be guarded against, the liner may be impregnated with a solution of silver nitrate to form a substantially insoluble deposit of silver chloride in the pores, joints and crevices of the liner upon contact with the hydrogen chloride. By this same procedure, the liner may be made substantially impervious to the penetration of dilute glacial or anhydrous acetic acid.

Where hydrofluoric acid is the critical element, treatment of the liner with lead acetate will result in the formation of a lead fluoride deposit to fill the pores, joints and crevices.

As indicated, the methods employed may involve either the use of a soluble salt solution to produce a filler of an insoluble salt upon contact with a corrosive substance in the material handled by the equipment, or the filler may be produced by contact by the soluble salt deposit in the liner and an acid such as sulfuric or hydrochloric acid prior to actually placing the equipment in service to handle another corrosive substance. It is a principal object of the invention, however, to provide a liner of a substantially porous material in which the material of the liner is impregnated with a soluble salt capable of an exchange reaction with acidic components of fluids passing in contact with the liner, in order to form a substantially insoluble salt deposit within the pores and interstices of the liner material. It is also an object of the invention to provide initial impregnation in depth so that, where by erosion or otherwise the deposit of the insoluble salt may be removed or worn away from the initially exposed surfaces, fresh areas impregnated with the soluble salt will be exposed and subject to the formation of new deposits of the insoluble salt.

Although the invention has been set forth with more or less specific reference to a single form of use, and to a more or less specific method of procedure, other embodiments are to be contemplated. For example, the lining of a porous material may be a one piece lining either inserted in the casing, or formed in place in any suitable manner, as by casting, spraying on, or otherwise. Therefore, it is not intended that the invention be limited by such disclosures for the purpose of illustration, but only by the scope of the appended claims.

What is claimed is:

1. A method for forming a liner material substantially impervious to an acid corrosive fluid to be encountered in service comprising impregnating a porous inert structural liner material with an aqueous solution of a soluble metallic salt capable of reacting with an acid corrosive substance to form a substantially insoluble metallic salt by exchange reaction to deposit said soluble salt in the pores and interstices of said liner material, contacting said impregnated liner material with an acid corrosive substance to form an outer sealing layer of an insoluble metallic salt deposited in the pores and interstices of said liner material, closing said pores and interstices against further penetration and retaining the uncontacted soluble metallic salt as a deposit of such salt internally of the body of said liner material available for conversion.

2. A method according to claim 1 in which the soluble salt solution is an aqueous solution of lead acetate and the acid corrosive substance contains sulfuric acid.

3. A method according to claim 1 in which the liner material is impregnated as a series of individual liner units, the impregnated units assembled as a substantially continuous liner in a pressure resistant casing, and the assembled liner again impregnated with the soluble metallic salt solution prior to contact of the assembled liner with said acid corrosive substance.

4. A method according to claim 1 in which the liner material is introduced into a pressure resistant casing, as a liner therefor, prior to initial contact with said solution of a soluble metallic salt, impregnated with said soluble salt solution, and then contacted with said acid corrosive substance.

5. A liner material substantially impervious to corrosive fluids comprising a body of a substantially porous inert structural liner material, a soluble metallic salt, capable of reacting with an acid corrosive substance to form a substantially insoluble metallic salt by exchange reaction, contained within the body of said liner material as a deposit in the pores and interstices thereof, and a substantially insoluble metallic salt, consisting of the exchange reaction product of said soluble salt and an acid corrosive substance, contained as a deposit of such salt in the pores and interstices of said liner material adjacent the surface thereof sealing said surface and retaining the uncontacted soluble salt as an available deposit of such salt internally of the body of said liner material.

6. A liner material according to claim 5 in which the deposited, substantially insoluble salt is lead sulfate.

7. A liner material according to claim 5 in which the deposited, substantially insoluble salt is silver chloride.

ALBERT ABRAHAM, Jr.

REFERENCES CITED

The following references are of record in the file of this patent:

UNITED STATES PATENTS

| Number | Name | Date |
| --- | --- | --- |
| 2,448,685 | Ramadanoff | Sept. 7, 1948 |